(12) United States Patent
Denuit et al.

(10) Patent No.: US 7,769,770 B2
(45) Date of Patent: Aug. 3, 2010

(54) SECONDARY INDEX AND INDEXED VIEW MAINTENANCE FOR UPDATES TO COMPLEX TYPES

(75) Inventors: Bruno H. M. Denuit, Bellevue, WA (US); Stefano Stefani, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 830 days.

(21) Appl. No.: 10/891,220

(22) Filed: Jul. 14, 2004

(65) Prior Publication Data

US 2006/0015490 A1    Jan. 19, 2006

(51) Int. Cl.
*G06F 17/30* (2006.01)
(52) U.S. Cl. ...................... 707/759; 707/769
(58) Field of Classification Search .............. 707/200, 707/759
See application file for complete search history.

(56) References Cited

U.S. PATENT DOCUMENTS 5,396,625 A * 3/1995 Parkes .......................... 707/1
6,338,056 B1 * 1/2002 Dessloch et al. ............... 707/2

OTHER PUBLICATIONS

Bebel, Bartosz, et al., "Hierarchical Materialisation of Methods in Object-Oriented Views: Design, Maintenance, and Experimental Evaluation," *Proceedings of the 4th ACM international workshop on Data warehousing and OLAP*, Nov. 2001, pp. 77-84.

Goldstein, Jonathan, et al., "Optimizing Queries Using Materialized Views: A Practical, Scalable Solution," *ACM SIGMOD Record, Proceedings of the 2001 ACM SIGMOD international conference on Management of data*, vol. 30, Issue 2, May 2001, pp. 331-342.

Graefe, Goetz, "Query Evaluation Techniques for Large Databases," *ACM Computing Surveys (CSUR)*, vol. 25, Issue 2, Jun. 1993, pp. 73-170.

Hanson, Eric N., "A Performance Analysis of View Materialization Strategies," *ACM SIGMOD Record, Proceedings of the 1987 ACM SIGMOD international conference on Management of data*, vol. 16, Issue 3, Dec. 1987, pp. 440-453.

Jones, Matthew C., et al. "View Materialization Techniques for Complex Hierarchical Objects," *Proceedings of the sixth international conference on Information and knowledge management*, Jan. 1997, pp. 222-229.

Kotidis, Yannis, et al., "A Case for Dynamic View Management," *ACM Transactions on Database Systems (TODS)*, vol. 26, Issue 4, Dec. 2001, pp. 388-423.

(Continued)

*Primary Examiner*—Charles Rones
*Assistant Examiner*—Mellissa M Chojnacki
(74) *Attorney, Agent, or Firm*—Woodcock Washburn LLP

(57) ABSTRACT

Pursuant to receipt of a data modification command or statement, such as an Update command, it is determined which fields in a data structure, such as a UDT, computed column, indexed view, or index, for example, will be changed as a result of the command. Only those fields that are affected by the command will be changed. Thus, changes are propagated to only to those dependent data structures whose content is being modified. Tree representations are used to facilitate the determination as to whether a subfield in a hierarchy is changed.

13 Claims, 9 Drawing Sheets

OTHER PUBLICATIONS

Kotidis, Yannis, et al., "DynaMat: A Dynamic View Management System for Data Warehouses," *ACM SIGMOD Record, Proceedings of the 1999 ACM SIGMOD international conference on Management of data*, vol. 28, Issue 2, Jun. 1999, pp. 371-382.

Lee, Ken C.K., et al. "Incremental View Update for a Mobile Data Warehouse," *Proceedings of the 1998 ACM symposium on Applied Computing*, Feb. 1998, pp. 394-399.

Mistry, Hoshi, et al., "Materialized View Selection and Maintenance Using Multi-Query Optimization," *ACM SIGMOD Record, Proceedings of the 2001 ACM SIGMOD International conference on Management of data*, vol. 30, Issue 2, May 2001, pp. 307-318.

Ross, Kenneth A., et al., "Materialized View Maintenance and Integrity Constraint Checking: Trading Space for Time," *ACM SIGMOD Record, Proceedings of the 1996 ACM SIGMOD international conference on Management of data*, vol. 25, Issue 2, Jun. 1996, pp. 447-458.

Roussopoulos, Nicholas, "View Indexing in Relational Databases," *ACM Transactions on Database Systems (TODS)*, vol. 7, Issue 2, Jun. 1982, pp. 258-290.

\* cited by examiner

SECONDARY INDEX AND INDEXED VIEW MAINTENANCE FOR UPDATES TO COMPLEX TYPES

FIELD OF THE INVENTION

The present invention relates generally to the field of information storage and retrieval, and, more particularly, to query optimization and management.

BACKGROUND OF THE INVENTION

Traditional approaches to the organization of information in computer systems have centered on the use of file-folder-and-directory-based systems ("file systems") to organize files into directory hierarchies of folders based on an abstraction of the physical organization of the storage medium used to store the files. Typically, storable data has been organized into files, folders, and directories at the operating system level. These files generally include the file hierarchy itself (the "directory") embodied in a special file maintained by the file system. This directory, in turn, maintains a list of entries corresponding to all of the other files in the directory and the nodal location of such files in the hierarchy (herein referred to as the folders). Such has been the state of the art for approximately forty years.

However, while providing a reasonable representation of information residing in the computer's physical storage system, a file system is nevertheless an abstraction of that physical storage system, and therefore utilization of the files requires a level of interpretation between what the user manipulates (units having context, features, and relationships to other units) and what the operating system provides (files, folders, and directories). Consequently, users (applications and/or end-users) have no choice but to force units of information into a file system structure even when doing so is inefficient, inconsistent, or otherwise undesirable. Because most existing file systems utilize a nested folder metaphor for organizing files and folders, as the number of files increases, the effort necessary to maintain an organization scheme that is flexible and efficient becomes quite daunting.

Several unsuccessful attempts to address the shortcomings of file systems have been made in the past. Some of these previous attempts have involved the use of content addressable memory to provide a mechanism whereby data could be accessed by content rather than by physical address. However, these efforts have proven unsuccessful because, while content addressable memory has proven useful for small-scale use by devices such as caches and memory management units, large-scale use for devices such as physical storage media has not yet been possible for a variety of reasons, and thus such a solution simply does not exist. Other attempts using object-oriented database (OODB) systems have been made, but these attempts, while featuring strong database characteristics and good non-file representations, were not effective in handling file representations and could not replicate the speed, efficiency, and simplicity of the file-and-folder-based hierarchical structure at the hardware/software interface system level.

Newly developed storage systems, such as "WinFS" (described further below) store the directory of the files as table(s) in a database. Each file is represented by a row in a base table, and file system operations, such as "enumerate all files in a directory", are satisfied using queries against the database engine. Thus, efficiently performing basic operations against the store involves efficiently optimizing database queries.

In such storage systems, the concept of a file is extended to that of an "object". Metadata about the file is stored in a managed CLR (common language runtime) object with a schema (defined in the storage system) to represent the allowable descriptive data for that object. For example, a picture would have a representative CLR object that would store data such as its resolution, time it was taken, and location information. This object model supports data inheritance. With data inheritance, it is possible to derive a type from another and add new fields. For example, a sub-class of the picture could be created, such as "DriversLicensePicture". Such a sub-class would contain extra information, such as a Driver's License ID field.

In these newly developed storage systems, such as WinFS, the exposed schemas are mapped to tables through a translation layer. Users only see a series of views of the data instead of operating on the base tables. While the exact design of this mapping is not significant, it serves as the glue between the WinFS API and the underlying storage format. Users do not control or see this mapping directly.

The WinFS store also exposes the concept of querying objects based on their type, as opposed to their file name as in earlier conventional file systems. Type-based queries can search for an exact type or any type that derives from a given type. This latter form is called hierarchical matching, and it is expected to be a common WinFS operation. WinFS also supports searching by file.

WinFS's schema model poses some new challenges to the query processor. User-defined types, or UDTs, are used extensively, and it is common to retrieve all UDTs from a table based on the UDT type. Furthermore, WinFS uses UDT inheritance, and it is also a requirement to retrieve all elements of a given type and also any subtype from a table. Multiple tables exist, each containing a different number of UDTs, types, type topology, and UDT distribution within that topology. Additionally, searching operations may go beyond those operations seen in traditional relational database systems to include, for example, searching of XML documents or performing searches over all fields in an object. These properties make it difficult to make accurate cardinality and cost estimates, and also make it difficult to efficiently retrieve values based on type/subtype hierarchy.

Materialized views (also referred to herein as indexed views) have been a subject of database research for over a decade. The basic idea is to materialize, or store, the result of some query, then use such computed result when similar queries are submitted to the database. For example, it may be desirable to store the result of sales per day, for example, and use the result (this materialized view) in the future to answer several related queries, such as sales in a given month or total sales in the year.

For additional flexibility, applications should not need to be aware that certain views exist, or are materialized. The query processor should identify matches between user queries and existing pre-computed results (materialized views), and use such results when applicable. This is known as the view utilization problem: Given a user query written over base tables, as well as a collection of materialized views, which materialized views can be used to answer such query? And the cost-based variant of the question: Which of those materialized views should be used?

Materialized views are similar to indices, in that they should be part of the physical design of the database and their primary purpose is to improve performance. The logical design of the database, and correctness of applications should be independent of the presence or absence of materialized views. As with indices, materialized views can introduce dramatic improvements in query performance.

Query optimizers are normally structured such that there is an initial simplification stage, followed by exploration of alternatives and cost-based selection of an execution plan, as shown in FIG. 1.

During the simplification/normalization stage 2, some changes are made on the original query Q, such as pushing selections down, or rewriting a subquery as a join, when possible. These modifications are aimed at obtaining a "better" query. Typically, there is no detailed cost estimation at this stage, and a single "better" query Q' is produced as the result.

The second stage 5 (exploration and cost-based selection) in optimization is directed to generating multiple alternatives, and using a detailed cost model to select the alternative with the cheapest estimated execution cost. Two conventional architectures for the exploration stage are bottom-up, dynamic programming join enumeration, and transformation-driven generation of alternatives. Both architectures set up a table of alternatives, as is well known, which compactly encodes the various possibilities for each sub-expression of a query.

The SQL query language provides a user with the ability to query (and modify) tabular data stored using the relational data model. The relational data model dictates that each cell in a table (a column of a row) is a single scalar (or atomic) value. The structured query language (SQL) is an American National Standards Institute (ANSI) standard used to communicate with a relational database. SQL statements are used to perform tasks such as update data or retrieve data from a relational database. Although many database systems use SQL, many of them also have their own additional proprietary extensions that are usually only used on their system. However, the standard SQL commands such as "Select", "Insert", "Update", "Delete", "Create", and "Drop" can be used to accomplish many things that one desires to do with a relational database and are believed to be well known to those skilled in the database art.

The SQL Server database management system (DBMS) supports secondary indexes and indexed views built over tables, to speed up certain kinds of data retrieval operations. A secondary index is a data structure organized like a tree, which contains a subset of the columns belonging to the table. An indexed view is the pre-computed result of a query stored into a derived table, which can have secondary indexes as well. Secondary indexes and indexed views are referred to as data structures dependent on the table. Other kinds of dependent objects exist, such as constraints.

When an Insert, Update, or Delete statement is processed, the DBMS has to propagate the change from the table to the dependent structures, so that they are always kept consistent which each other. This allows subsequent data retrieval queries to return the same data independently on whether they access the table, a secondary index, or an indexed view. Thus, whenever modifications are made to the table, they must be made to the secondary indexes and indexed views, as well. The cost of making changes is proportional to the number of places where the change has to be made. While Insert and Delete operations need to be propagated to all the secondary indexes and indexed views, Update statement processing is conventionally optimized to propagate the change only to the data structures that carry columns being modified by the statement. For example, if a secondary index only contains the column C1 of a table T, an update to the C2 column will not be propagated to the index, because its content will be unchanged.

Both secondary indexes and indexed views can be built in SQL Server over both regular table columns and scalar expressions over table columns. For example, it is possible to build a secondary index over the sum of the C1 and C2 columns. Conventionally, whenever an Update statement affects one or more of the columns participating in a scalar expression, the expression will be assumed to be changing, and the change will be propagated to all the dependent data structures that carry this expression.

Support for complex data types has been added to SQL Server through UDTs. The syntax of the SQL Update statement allows granular updates to subfields of a UDT, along with the ability to overwrite an entire column with a new value. However, by using the traditional technique described above for scalar expressions, a granular update to a UDT would be assumed to affect all the data structures dependent on any of its subfields, and thus changes are propagated to dependent data structures whose content might not be modified by the update. This technique is inefficient and expensive. In other words, conventionally, granular updates to UDT columns are assumed to affect all its subfields, thereby degrading performance in the presence of many dependent access paths.

For example, in the prior art, for an Update, it is assumed that if any of the terms in the expression are being changed, then the entire expression is being changed. For example, in the computed column PERSON.ADDRESS.ZIP, when any of PERSON's subfields are updated, it is assumed that the address and zip also change, so the computed column is always updated. This is a very conservative approach, and not desirable.

In view of the foregoing, there is a need for systems and methods that overcome the limitations and drawbacks of the prior art.

SUMMARY OF THE INVENTION

The following summary provides an overview of various aspects of the invention. It is not intended to provide an exhaustive description of all of the important aspects of the invention, nor to define the scope of the invention. Rather, this summary is intended to serve as an introduction to the detailed description and figures that follow.

Pursuant to receipt of a data modification command or statement, such as an Update command, it is determined which fields in a data structure, such as a user-defined type (UDT), computed column, indexed view, or index, for example, will be changed as a result of the command. Only those fields that are affected by the command will be changed. Thus, changes are propagated to only to those dependent data structures whose content is being modified. Tree representations are used to facilitate the determination as to whether a subfield in a hierarchy is changed.

Exemplary embodiments include a method of processing a data modification statement, comprising receiving a data modification statement, determining which fields of a data structure are affected by the data modification statement, and modifying a query plan in response to the fields of the data structure that are affected by the data modification statement.

According to aspects of the invention, a tree representation for the data modification statement is determined, along with operator trees representing the expressions of the secondary structures related to the involved tables. Both trees are compared to determine which secondary structures are affected by the data modification statement.

Another exemplary embodiment is directed to a system for processing a data modification statement, comprising a front end that receives a data modification statement, and a query optimizer that determines which fields of a data structure are affected by the data modification statement, and modifies a query plan responsive to the fields of the data structure that are affected by the data modification statement.

According to aspects of the invention, the front end comprises a parser and algebrizer that transforms the textual representation of the data modification statement into tree nodes. The front end may be adapted to determine a tree representation for the data modification statement and for the expressions of secondary structures. The query optimizer may be adapted to determine which secondary structures are affected by the data modification statement by comparing the tree representation for the secondary structures and the tree representation for the data modification statement.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF PREFERRED EMBODIMENTS

The subject matter is described with specificity to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Exemplary Computing Environment

Figure 1:
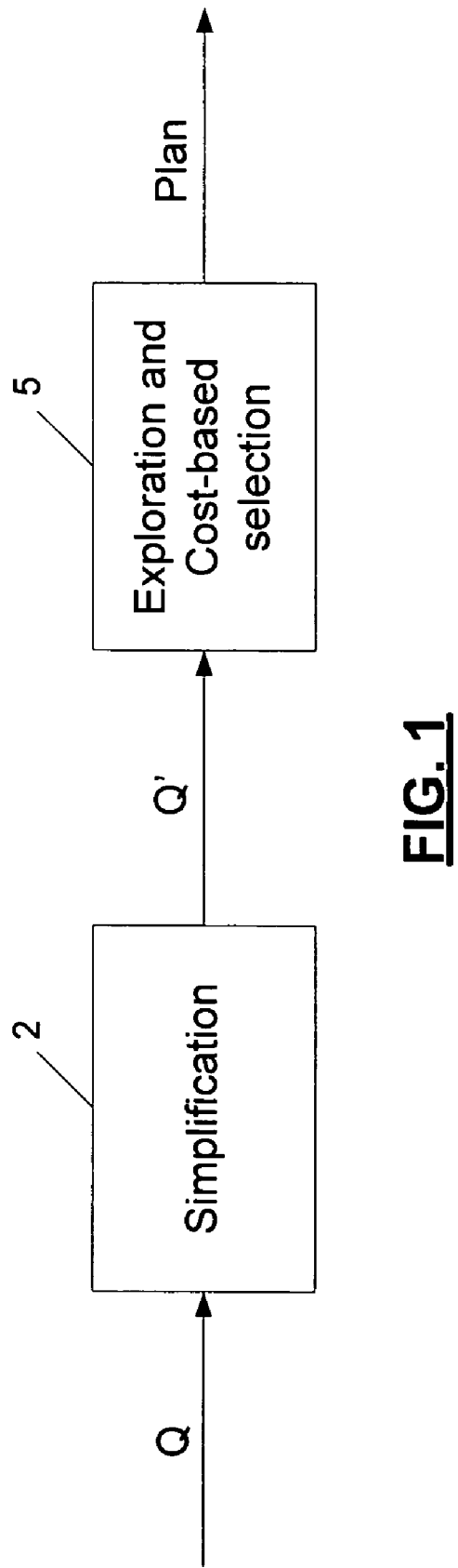
FIG. 1 is a block diagram of a conventional query optimizer.
Figure 2:
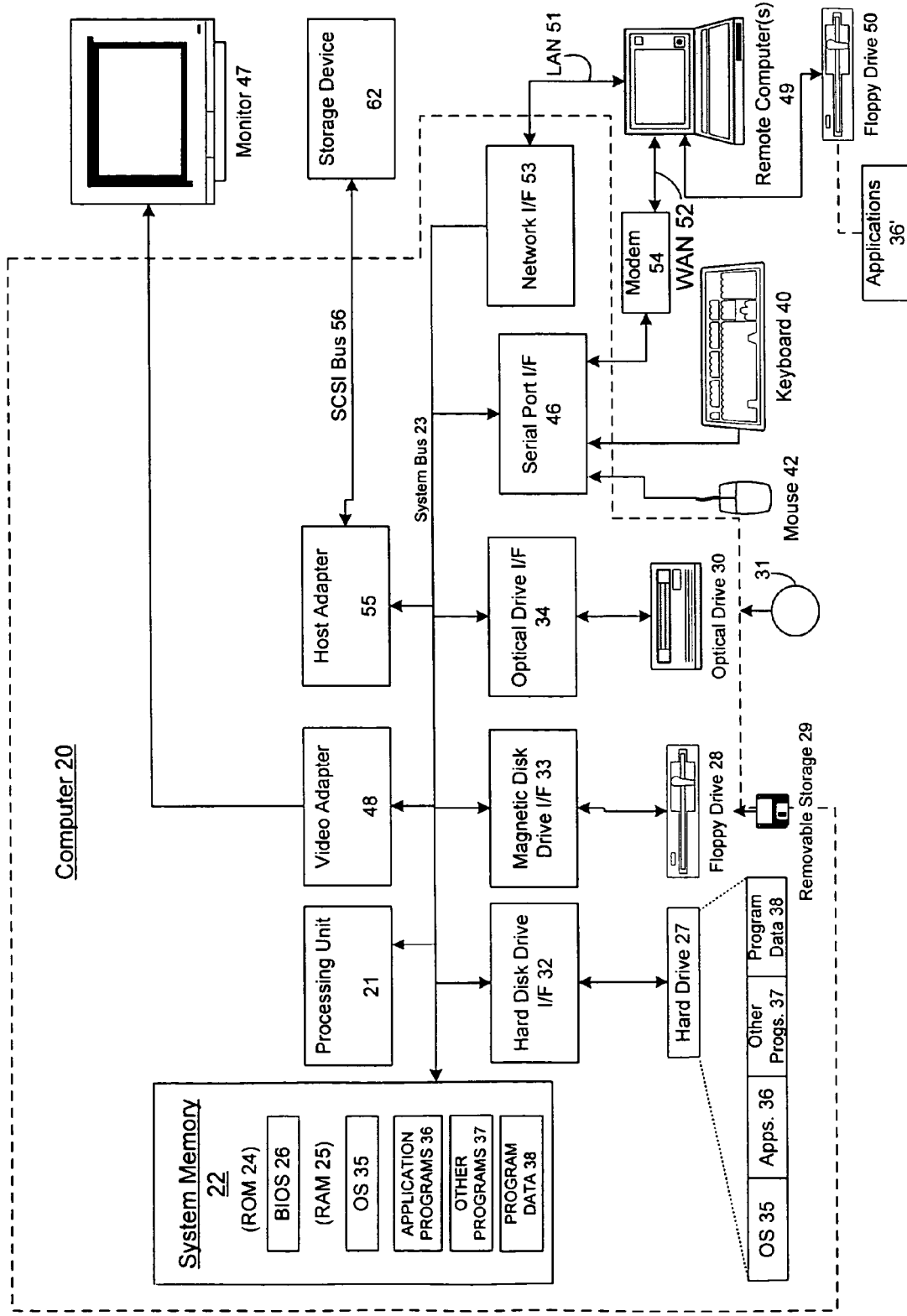
FIG. 2 is a block diagram representing a computer system in which aspects of the present invention may be incorporated.

Numerous embodiments of the present invention may execute on a computer. FIG. 2 and the following discussion are intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types.

An "object" is a unit of storable information accessible to a hardware/software interface system that has a basic set of properties that are commonly supported across all objects exposed to an end-user by the hardware/software interface system shell. Objects also have properties and relationships that are commonly supported across all types including features that allow new properties and relationships to be introduced. A complex structured type consists of a set of fields, properties, and methods. Each field or property can be one of a scalar type, a complex structure type itself, or of a multiset in which each element is a complex structured type.

Those skilled in the art will appreciate that the invention may be practiced with other computer system configurations, including handheld devices, multiprocessor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 2, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24.

The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide nonvolatile storage of computer readable instructions, data structures, program modules and other data for the personal computer 20.

Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 2 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 2. The logical connections depicted in FIG. 2 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

While it is envisioned that numerous embodiments of the present invention are particularly well-suited for computerized systems, nothing in this document is intended to limit the invention to such embodiments. On the contrary, as used herein the term "computer system" is intended to encompass any and all devices comprising press buttons, or capable of determining button presses, or the equivalents of button presses, regardless of whether such devices are electronic, mechanical, logical, or virtual in nature.

Figure 3:
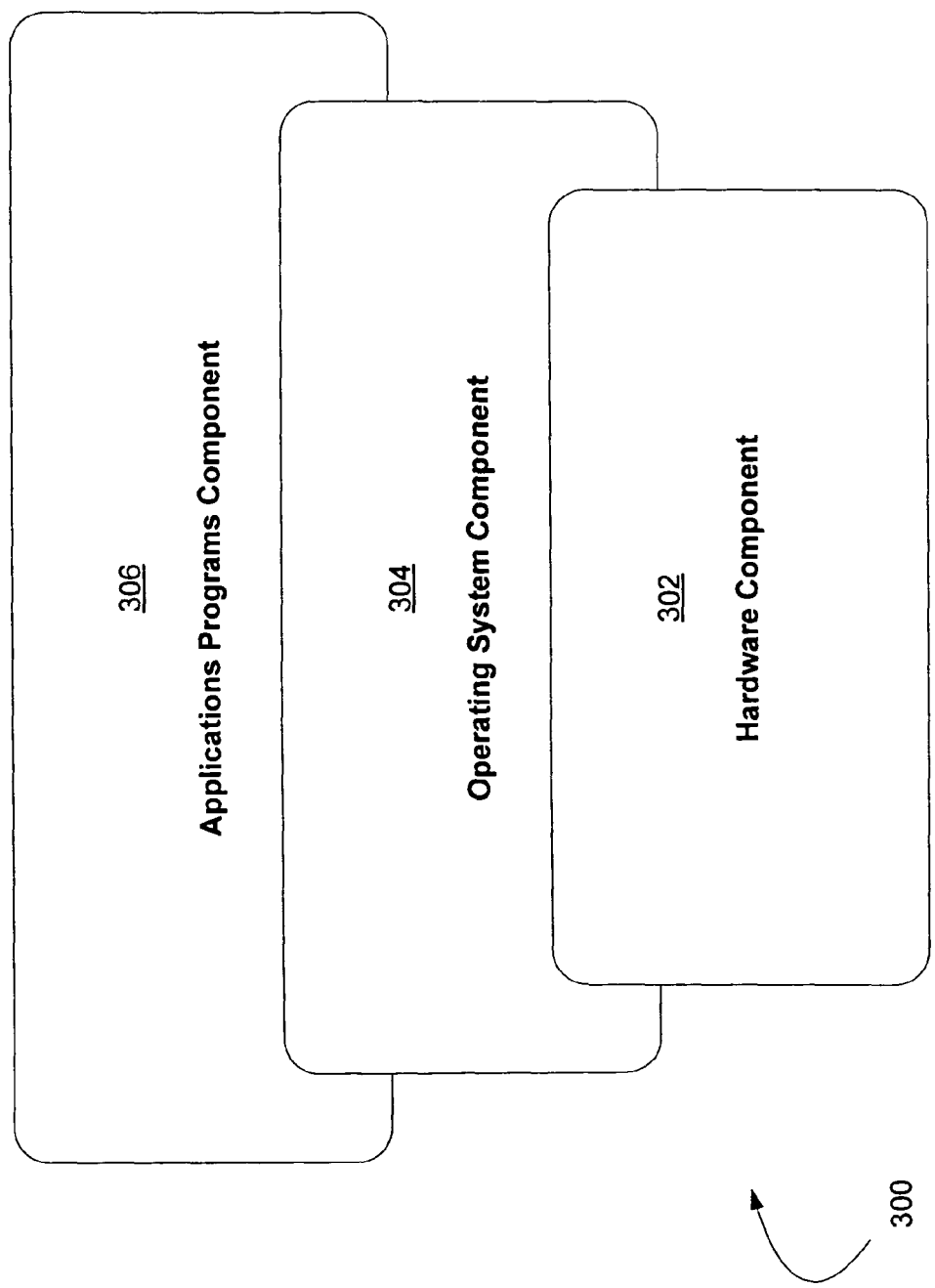
FIG. 3 is a block diagram illustrating a computer system divided into three component groups: the hardware component, the operating system component, and the applications programs component.

As illustrated in the block diagram of FIG. 3, a computer system 300 can be roughly divided into three component groups: the hardware component 302, the operating system component 304, and the applications programs component 306.

In certain computer systems 300, and referring back to FIG. 2, the hardware 302 may comprise the central processing unit (CPU) 21, the memory (both ROM 24 and RAM 25), the basic input/output system (BIOS) 26, and various input/output (I/O) devices such as a keyboard 40, a mouse 42, a monitor 47, and/or a printer (not shown), among other things. The hardware component 302 comprises the basic resources for the computer system 300.

The applications programs component 306 comprises various software programs including but not limited to compilers, database systems, word processors, business programs, videogames, and so forth. Application programs provide the means by which computer resources are utilized to solve problems, provide solutions, and process data for various users (e.g., machines, other computer systems, and/or end-users).

The operating system component 304 comprises the operating system itself and its shell and kernel. An operating system (OS) is a special program that acts as an intermediary between application programs and computer hardware, and the purpose of an operating system is to provide an environment in which a user can execute application programs. The goal of any operating system is to make the computer system convenient to use, as well as utilize the computer hardware in an efficient manner.

The operating system is generally loaded into a computer system at startup and thereafter manages all of the application programs (or simply "applications") in the computer system. The application programs interact with the operating system by requesting services via an application program interface (API). Some application programs enable end-users to interact with the operating system via a user interface such as a command language or a graphical user interface (GUI).

An operating system traditionally performs a variety of services for applications. In a multitasking operating system where multiple programs may be running at the same time, the operating system determines which applications should run in what order and how much time should be allowed for each application before switching to another application for a turn. The operating system also manages the sharing of internal memory among multiple applications, and handles input and output to and from attached hardware devices. The operating system also sends messages to each application (and, in certain cases, to the end-user) regarding the status of operations and any errors that may have occurred.

An operating system's shell is the interactive end-user interface to an operating system. A shell is the outer layer of an operating system that is directly accessible by application programs and even directly by end-users. In contrast to a shell, the kernel is an operating system's innermost layer that interacts directly with the hardware components.

As well understood by those of skill in the relevant art, "files" are entities of information (including but not limited to the operating system itself, as well as application programs, data sets, and so forth) that are capable of being manipulated as discrete (storable and retrievable) entities by an operating system. In modern operating systems, files are the basic units of storable information (e.g., data, programs, and so forth) that are manipulated by the operating system, and groups of files are organized in "folders".

Figure 4:
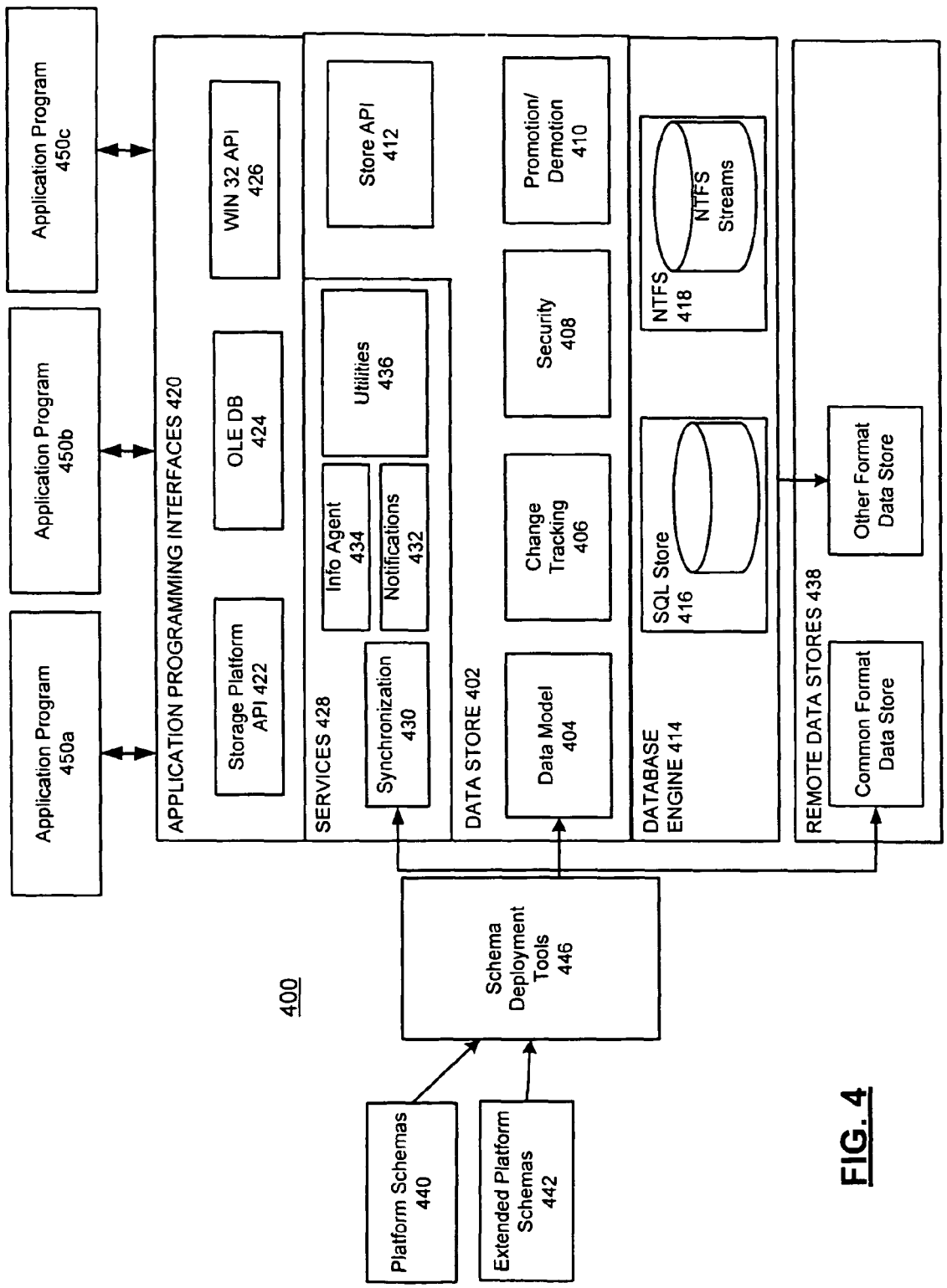
FIG. 4 illustrates an exemplary storage platform that can be used with the present invention.

A storage platform for organizing, searching, and sharing data that can be used with the present invention is designed to be the store for all types of data. Referring to FIG. 4, a storage platform 400 in accordance with the present invention comprises a data store 402 implemented on a database engine 414. In one embodiment, the database engine comprises a relational database engine with object relational extensions. In one embodiment, the relational database engine 414 comprises the Microsoft SQL Server relational database engine.

The data store 402 implements a data model 404 that supports the organization, searching, sharing, synchronization, and security of data. Specific types of data are described in schemas, such as schemas 440, 442 and the storage platform 400 provides tools 446 for deploying those schemas as well as for extending those schemas.

A change tracking mechanism 406 implemented within the data store 402 provides the ability to track changes to the data store. The data store 402 also provides security capabilities 408 and a promotion/demotion capability 410. The data store 402 also provides a set of application programming interfaces 412 to expose the capabilities of the data store 402 to other storage platform components and application programs (e.g., application programs 450a, 450b, and 450c) that utilize the storage platform.

The storage platform of the present invention still further comprises an application programming interface (API) 420, which enables application programs, such as application programs 450a, 450b, and 450c, to access all of the foregoing capabilities of the storage platform and to access the data described in the schemas. The storage platform API 422 may be used by application programs in combination with other APIs, such as the OLE DB API 424 and the Microsoft Windows Win32 API 426.

The storage platform 400 of the present invention may provide a variety of services 428 to application programs, including a synchronization service 430 that facilitates the sharing of data among users or systems. For example, the synchronization service 430 may enable interoperability with other data stores 438 having the same format as data store 402, as well as access to data stores having other formats. The storage platform 400 also provides file system capabilities that allow interoperability of the data store 402 with existing file systems, such as the Windows NTFS file system 418. A SQL store 416 may also be provided.

In at least some embodiments, the storage platform 400 may also provide application programs with additional capabilities for enabling data to be acted upon and for enabling interaction with other systems. These capabilities may be embodied in the form of additional services 428, such as an Info Agent service 434 and a notification service 432, as well as in the form of other utilities 436.

In at least some embodiments, the storage platform is embodied in, or forms an integral part of, the hardware/software interface system of a computer system. For example, and without limitation, the storage platform of the present invention may be embodied in, or form an integral part of, an operating system, a virtual machine manager (VMM), a Common Language Runtime (CLR) or its functional equivalent, or a Java Virtual Machine (JVM) or its functional equivalent, or other such software components in the place of or in addition to the operating system in a computer system. The purpose of a hardware/software interface system is to provide an environment in which a user can execute application programs.

Through its common storage foundation, and schematized data, the storage platform of the present invention enables more efficient application development for consumers, knowledge workers, and enterprises. It offers a rich and extensible programming surface area that not only makes available the capabilities inherent in its data model, but also embraces and extends the existing file system and database access methods.

In the description herein, and in various ones of the figures, the storage platform 400 of the present invention may be referred to as "WinFS." However, use of this name to refer to the storage platform is solely for convenience of description and is not intended to be limiting in any way.

The data store 402 of the storage platform 400 of the present invention implements a data model that supports the organization, searching, sharing, synchronization, and security of data that resides in the store. The data model provides a mechanism for declaring objects and object extensions and for establishing relationships between objects and for organizing and categorizing objects.

The relational database engine 414, which in one embodiment comprises the Microsoft SQL Server engine, supports built-in scalar types. Built-in scalar types are "native" and "simple". They are native in the sense that the user cannot define their own types and they are simple in that they cannot encapsulate a complex structure. User-defined types ("UDTs") provide a mechanism for type extensibility above and beyond the native scalar type system by enabling users to extend the type system by defining complex, structured types. Once defined by a user, a UDT can be used anywhere in the type system that a built-in scalar type might be used.

The storage platform schemas are mapped to UDT classes in the database engine store. Data store objects are mapped to UDT classes deriving from the Base.Item type. Extensions are also mapped to UDT classes and make use of inheritance. The root Extension type is Base.Extension, from which all Extension types are derived.

A UDT is a CLR class—it has state (i.e., data fields) and behavior (i.e., routines). UDTs are defined using any of the managed languages—C#, VB.NET, etc. UDT methods and operators can be invoked in T-SQL against an instance of that type. A UDT can be the type of a column in a row, the type of a parameter of a routine in T-SQL, or the type of a variable in T-SQL, for example.

Exemplary Embodiments

The present invention is directed to optimizing granular updates to UDTs or other data structures in the presence of indexes or indexed views over scalar expressions that represent their subfields. Exemplary optimization comprises detecting if such indexes or indexed views over UDT subfields are affected by a data modification statement (e.g., an Update command), and changes are propagated only to the dependent data structures whose content is being modified. Aspects of the invention involve detecting the presence of scalar expressions representing a subfield or subfields of a UDT inside an index or indexed view definition or any other kind of dependent object, matching such expressions against the representation of the granular update being run, and determining whether the data structure needs to be maintained or not.

Pursuant to receipt of a data modification command or statement, such as an Update command, it is determined which fields in a data structure, such as a UDT, computed column, indexed view, or index, for example, will be changed as a result of the command. An Update command is used in the description of the exemplary embodiments described herein, but it is contemplated that other types of data modification commands or statements may be used. Only those fields that are affected by the command will be changed. Thus, changes are propagated to only to those dependent data structures whose content is being modified. Tree representations are used to facilitate the determination as to whether a subfield in a hierarchy is changed.

For example, a computed column has a representation in tree form. This tree representation is obtained, along with a tree representation of the data modification statement or command. The two tree representations are compared to determine if the computed column should be updated.

Figure 5:
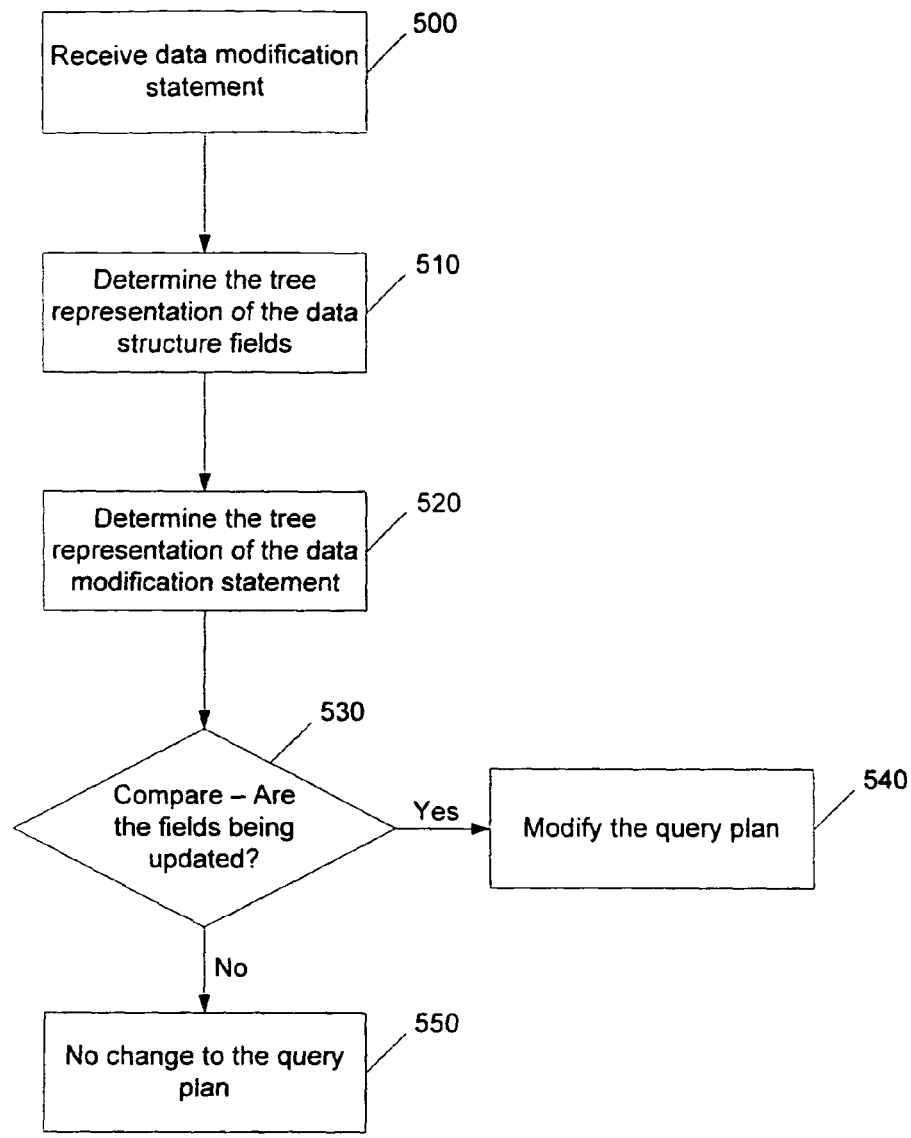
FIG. 5 shows a flow diagram of an exemplary method of processing a data modification statement in accordance with the present invention.

Similarly, indexed views (stored pre-computed query results) can be used in accordance with the present invention. FIG. 5 shows a flow diagram of an exemplary method of processing a data modification statement in accordance with the present invention. At step 500, a data modification statement is received, along with a textual representation of the indexed view (which may be received or determined separately). An operator tree (i.e., a relational tree) that defines the indexed view (or whatever field of the data structure is being considered) is then determined, at step 510. At step 520, a tree representation for the data modification statement is determined. For each of the relational operators in the tree determined at step 510, its child scalar expressions are obtained, and compared to the update tree from step 520 to determine if the fields of the data structure being considered are being updated, at step 530. If so, the query plan is modified accordingly, at step 540. If the fields of the data structure being considered are not to be changed or otherwise modified by the data modification command or statement, then no change is made to the related portion of the query plan, at step 550.

In particular, a query processor walks the tree representation of the update, trying to match subfields used in the index expressions with those being updated. If a match is found, the corresponding index expression is considered to be changed and a query execution plan will be generated that propagates the update to the index. Because only the subfields that are being changed or updated by the data modification command are considered, the runtime (disk access) is thus more efficient. Examples are provided with respect to FIGS. 8-10.

Database management systems (DBMS) allow modification of existing table rows through Update statements or other data modification commands. For example, a user may specify, via a command statement, the table to update (called the target table), the columns to modify and their respective new value(s), and qualify the rows to be updated through a Where clause, which is similar to that in a Select statement.

Figure 6:
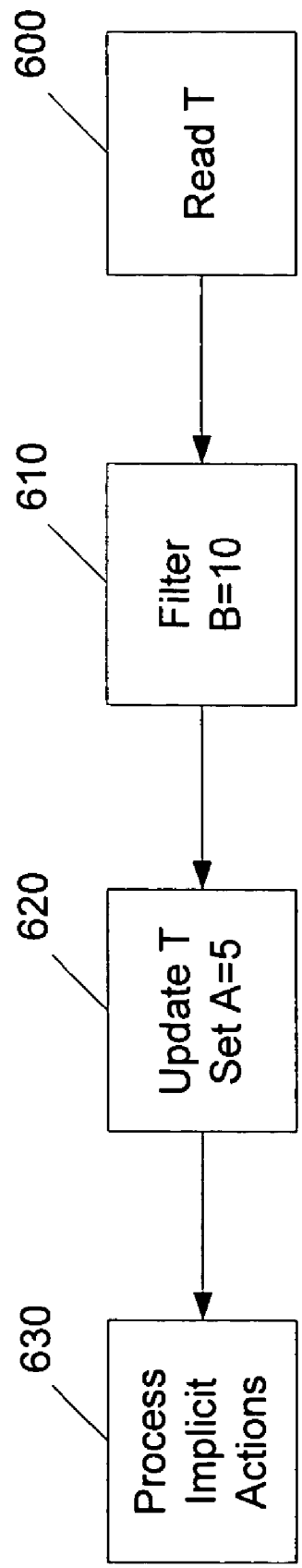
FIG. 6 is a flow diagram of an example that is useful in describing the present invention.

An example of an Update statement is "Update T set A=5 Where B=10", which means that for each row in table T where column B is 10, column A has to be set to 5. A flow diagram of exemplary steps involved when receiving this statement in this example is shown in FIG. 6. At step 600, the table T is read. A filter is applied to the table at step 610 to determine which column B's are "10". At step 620, the column A's corresponding to the "10" column B's are "updated" to be set equal to "5".

The updating during step 620 uses an update query plan compiled by a query optimizer, described further below. The update query plan compiled by the query optimizer guarantees the preservation of data integrity after its execution. This is achieved by a proper instrumentation of the plan, with actions falling in two categories, either validating a constraint or maintaining a dependent data structure so that its content remains consistent with the target table. DBMSs allow redundant duplication of data in secondary data structures, to allow faster processing of certain categories of queries. Maintaining consistency between the base table and its dependent secondary structures allows subsequent data retrieval queries to receive the same results, independently from the data source that is chosen to implement the operation.

An Update statement can hence be seen as firing actions that were not explicitly described in the original syntax, but that are implicitly used in order to preserve data integrity. These actions are performed at step 630. Typical implicit actions are: secondary index maintenance; indexed view maintenance; check and referential integrity constraint validation; cascading actions; full text notifications; and query notifications. In SQL Server, the implicit update actions are desirably performed after modifying the base table and in appropriate order.

In order to identify the desired implicit actions to include in the update query plan, the SQL Server query optimizer enumerates the various kinds of objects that have a dependency on the table being updated. For each object, it is determined if the object is affected by the statement. If this is the case, the plan is modified to include appropriate operators guaranteeing that its execution does not cause data corruption for the object. An object is considered to be affected by the statement only if referencing one or more of the columns being updated.

Avoiding maintenance of objects that do not reference columns or other data structure fields being updated is a compile-time optimization that avoids processing operations guaranteed to be unnecessary by the syntax of the statement. Such optimization is desirable in order to guarantee acceptable performance. The number of dependent objects can be very high, and some of the implicit actions used to maintain them can be extremely expensive.

Figure 7:
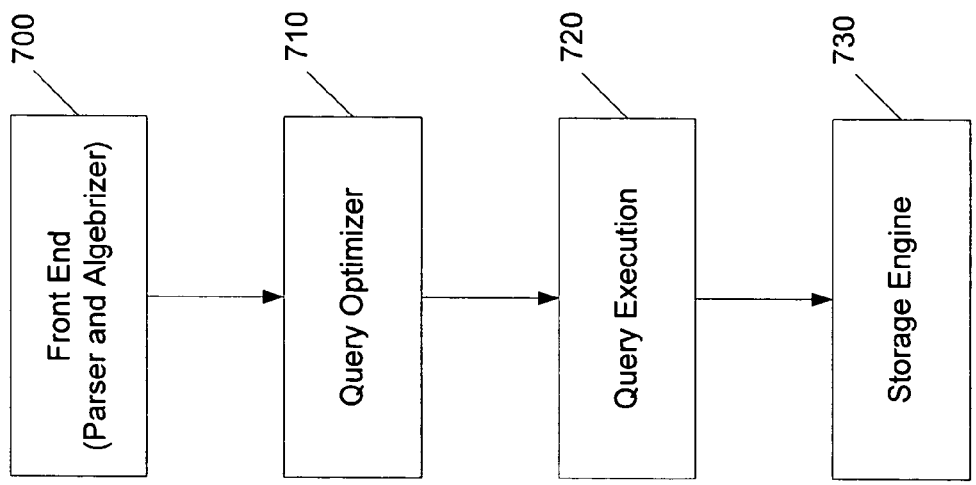
FIG. 7 is a block diagram of an exemplary system in accordance with the present invention.

Query processing in accordance with the present invention is implemented in the SQL Server DBMS through the interaction of the following exemplary components, as shown in FIG. 7: a front end (parser and algebrizer) 700, a query optimizer 710, a query execution component 720, and a storage engine 730. The front end 700 and query optimizer 710 perform at compile time, and the query execution component 720 and storage engine 730 perform during execution time.

A SQL command or data modification statement, such as Update, is received (e.g., as text from a user). The front end 700 receives the query statement in textual format, and converts it to a tree based representation describing at the logical level what the command is meant to do. In other words, a parser/algebrizer transforms the textual representation of the user's commands into tree nodes. The parser provides an update operator that internally represents the update statements functionally (semantically). The algebrizer provides TARGET TABLE, COLUMNS, NEW VALUES, TYPE OF UPDATE, for example.

The query optimizer 710 explores the possible alternative ways of implementing the query statement, trying to choose the most efficient. The query optimizer 710 produces another tree that represents, at the physical level, the plan to implement the query statement. A query optimizer generates the physical plan, by transforming the tree and finding the structural (physical) implementation that should be performed to implement the functionality. The optimizer determines the secondary indexes that are to be maintained (i.e., partial update index maintenance). The optimizer enumerates the dependencies on the TABLE (dependencies include indexed views and secondary indexes, for example). For each dependent object, the type of dependency is determined, along with what it is based on (e.g., based on a column(s) or an expression(s), based on a subfield of a UDT.) If the dependency is based on a UDT expression that extracts a subfield, then the syntax of the command is taken and it is determined if the dependent object is being affected by the update or not.

The query plan comprises appropriately interconnected query execution operators, which function by processing the rows they receive from their inputs, and passing the output of such processing to the operator that follows. The combination of the first two phases is called compilation, and its output—the query plan—is saved to memory to be reused in case the same query is issued again in the future. Techniques like substituting constants with logical parameters in the query statement allow more frequent reuse of the same plan.

The query execution component 720 executes the query plan generated by the query optimizer 710, interacting with the storage engine 730, which is the component that ultimately stores and retrieves the data. The query execution component receives subtrees for index maintenance from the optimizer, and executes the physical tree built by the query optimizer. Execution is performed by a storage engine to modify the data that is stored in the indexes, so that individual fields are updated.

Query execution plans for implementing Update statements in SQL Server are split in two phases. The first part is read only, and responsible for determining which rows are to be updated. The second part consumes the rows provided by the first, and performs the actual data modification.

It is contemplated that the invention can be used with any type of dependency and can be extended, among the others, to constraints over columns. Constraints may be user defined during table generation (e.g., zip code is 5 digits).

When processing a regular Update statement, the SQL Server query processor enumerates all the access paths dependent on the target table, extracts the list of columns used inside these dependent access paths, and verifies whether any of them is present in the assignment list. If this is the case, the content of the access path is considered to be changing, and the query execution plan is modified accordingly. For example, given a table T with columns (C1, C2, C3), and an index over C1+C2, an update of the form "Update T Set C1=2", will result in a query execution plan that propagates the changes to the index. The plan for the statement "Update T Set C3=10" will instead leave the index untouched, resulting in better performance at runtime.

This functionality is improved when the table contains one or more UDT type columns, with index expressions using subfields of these columns, for example. A granular update is represented in the SQL Server relational algebra as a tree of special-purpose scalar operators (referred to herein as "UdtMultiUpdate" and "UdtPropertySetter"). These operators are desirably behind the scenes and are not known to the user (the user is aware of "Update", but not these operators). The UdtPropertySetter scalar operator is used to set the value of a certain subfield of a UDT column or subfield. The UdtMultiUpdate scalar operator is used to group together updates to subfields of a UDT column or subfield. It can be stacked in a recursive fashion to describe updates to subfields at different levels in the UDT column.

Accessing UDT subfields in index expressions is represented by a scalar algebra tree using the scalar operator "UdtFunction", for example. This operator can also be stacked on top of itself to drill down into a UDT structure. The lowest node in such a tree is desirably an identifier node representing the UDT column and each UdtFunction node on top of that identifier node drills down one level in the UDT structure.

The examples below illustrate the use of both the UdtMultiUpdate/UdtPropertySetter and the UdtFunction operators. As noted above, when processing such a granular update statement, the SQL Server query processor will walk the tree representation of the update, trying to match subfields used in the index expressions with those being updated. If it finds a match, the corresponding index expression is considered to be changed and a query execution plan will be generated that propagates the update to the index.

An example is directed to a multi-level UDT structure, and a table T has a column "Person" of UDT type "Person". The Person type is defined as having the following structure:

```
type Person
{
    int ssn; // Social security number.
    int age; // Age.
    string name; // Name.
    type Address address; // Address. This is also a UDT type.
}
type Address
{
    string street; // Street.
    string zip; // Zip code.
}
```

The table also has two indexes over person.ssn and person.address.zip, respectively. Consider the following update, in which it is desired to change some subfields in the person UDT column. A user query is:

UPDATE T SET person.(age=10,
    address.(street='1 Microsoft Way',
      zip=98007))

Figure 8:
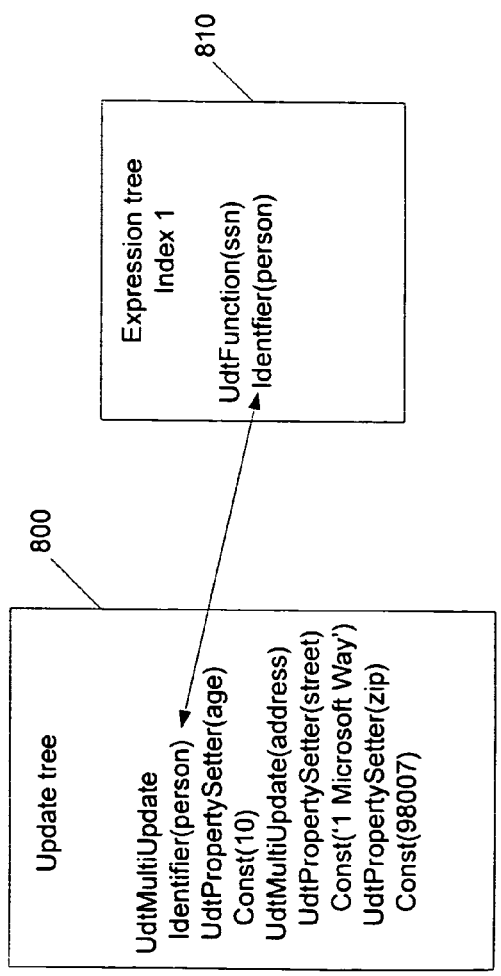
FIGS. 8, 9, and 10 show exemplary tree representations that are useful in describing the present invention.
Figure 9:
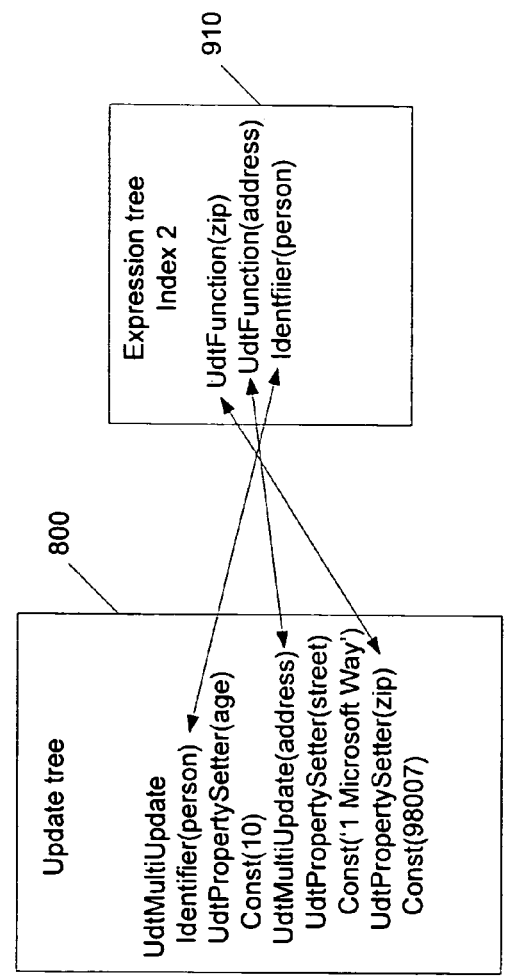

Person is a UDT with subfield age, and Address is a UDT with subfields Street, Zip. The above syntax (i.e., the Update command statement) gets translated into a tree representation to perform the processing of the update. An exemplary scalar tree for the Update command is shown in FIGS. 8 and 9 as scalar tree 800. A scalar tree for each of the index expressions is also generated. The scalar tree for the first index is shown in FIG. 8 as tree 810, and the scalar tree for the second index is shown in FIG. 9 as tree 910.

As can be seen from the trees in the example, the update tree 800 drills down into a UDT hierarchy, while the index expression trees 810, 910 represent subfields of the UDT, with scalar nodes towards the bottom of the tree representing subfields higher in the hierarchy. This is why the exemplary tree matching technique walks the update tree in a top-down fashion but matches subfields in the index expressions from bottom to top. An exemplary technique starts from the top of the update tree 800 identifying that the UDT column being partially updated is 'person'. For all the index expression trees 810, 910, it then looks at the bottom node, and tries to match this with Person. In this case, both index expressions match. Although the matching sequence of both index expression trees 810, 910 are described together, it is noted that each index expression is considered separately to reduce the complexity of the method.

Because up to this point both index expressions might be changed by the Update, the higher tree nodes in the index expression (and lower tree nodes in the update tree 800) are now processed. Thus, both the Address and SSN fields are matched against the child nodes of the top-level UdtMultiUpdate. In this example, only Address matches, and it can therefore be deduced that the first index (person.ssn) is not affected by this Update. The process continues for the second index, and Zip is then matched against the children of the UdtMultiUpdate(address) node. One of these children is UdtPropertySetter(zip), meaning the second index should be maintained.

Another example is directed to inheritance in a UDT. This example uses the table T set forth above, with an Address UDT and subtype of Address, USAddress, as shown:

```
type Address
{
    string street; // Street.
    string city; // City.
}
// USAddress is a subclass of Address; it contains all the members of
Address. type USAddress : Address
{
    int zip; // Zip code.
}
```

Just like in any object-oriented programming language, the SQL Server UDT architecture allows for subtypes of a UDT type to be stored, updated, and queried over instead of that UDT 'base' type. This means that some of the Person instances may contain a USAddress instead of the base Address. The 'Treat' keyword is used to treat certain types as one of their subtypes.

Assume a user's query is:
UPDATE T SET person.(age=10,
    TREAT(address as USAddress).(street='1 Microsoft Way',
        zip=98007))

Figure 10:
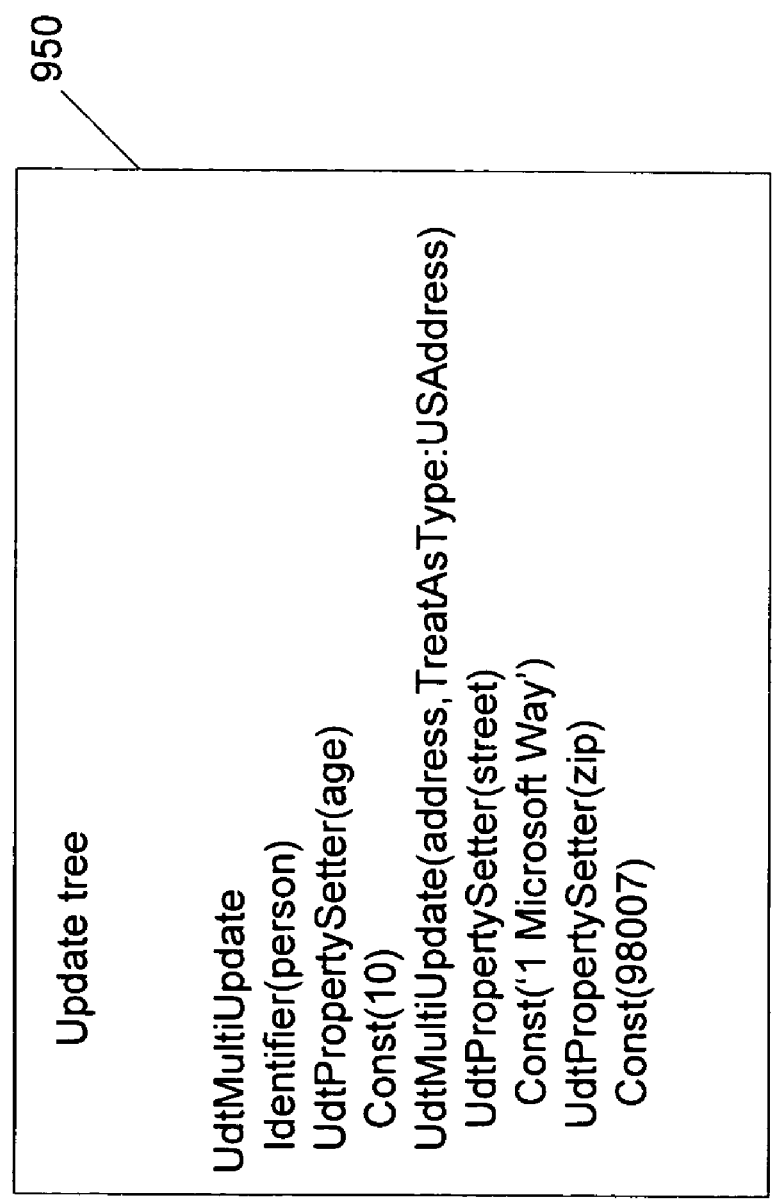

An exemplary update scalar tree 950 is shown in FIG. 10. The matching technique described above is used in processing this example as well. Note that every field in a UDT desirably has an ordinal that is unique for the whole inheritance hierarchy of that UDT. In the example above, if street and city in Address have ordinal 1 and 2 respectively, then zip will have ordinal 3, thus avoiding conflicts between derived classes. Subfields in the update expression are matched up with subfields in the index expressions using their ordinal numbers. This technique also allows the use of Treat in the index expressions.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the functionality of the present invention.

While the present invention has been described in connection with the preferred embodiments of the various figures, it is to be understood that other similar embodiments may be used or modifications and additions may be made to the described embodiments for performing the same functions of the present invention without deviating therefrom. Therefore, the present invention should not be limited to any single embodiment, but rather construed in breadth and scope in accordance with the appended claims.

What is claimed is:

1. A method of processing a data modification statement on a database in a computing device, comprising:
    receiving a data modification statement to modify data within the database;
    determining a tree representation for the received data modification statement;
    receiving a data structure comprising an indexed view of the database, the indexed view expressing a result of a predefined query applied to the database, the indexed view to be employed when a query similar to the predefined query is applied to the database;
    determining an operator tree as a relational tree that defines the received indexed view, the operator tree including a plurality of relational operators, each relational operator having child scalar expressions; and
    for each relational operator in the determined operator tree:
        obtaining the child scalar expressions of the relational operator;
        comparing the obtained child scalar expressions to the determined tree representation for the received data modification statement to determine that a corresponding field of the indexed view of the database is affected by the data modification statement, and based thereon modifying a query plan corresponding to the data modification statement so as to update the indexed view of the database to be consistent with the modified data within the database,
    wherein the data modification statement comprises an update command and the data structure comprises a user-defined type (UDT) derived by way of inheritance from another UDT, the derived UDT including each field of the another UDT and at least one additional field, the operator tree determined from the data structure referencing the another UDT and including an operator directing that the another UDT be treated as the derived UDT so as to access the at least one additional field, and
    wherein comparing the obtained child scalar expressions to the determined tree representation comprises walking the determined tree representation, matching subfields used in the child scalar expressions with subfields updated in the determined tree representation, and generating for each match a query execution plan to propagate the corresponding updated subfield to the index.

2. The method of claim 1, comprising determining that a field is affected by the data modification statement by comparing the tree representation for the fields of the data structure and the tree representation for the data modification statement.

3. The method of claim 2, wherein comparing the tree representation for the fields of the data structure and the tree representation for the data modification statement comprises, for each relational operator in the tree representation for the fields of the data structure, determining scalar expressions and comparing the scalar expressions to the tree representation for the data modification statement.

4. The method of claim 1, comprising determining that a field is affected by the data modification statement by walking the tree representation for the data modification statement attempting to match fields of the data structure.

5. The method of claim 4, wherein walking the tree representation for the data modification statement proceeds in a top-down manner and matches the fields of the data structure from bottom to top.

6. The method of claim 1, comprising determining that a field is affected by the data modification statement by matching fields of the data structure with fields in the data modification statement.

7. A system comprising a processor for processing a data modification statement on a computing device, comprising:
a front end that receives a data modification statement to modify data within the database and determines a tree representation for the received data modification statement; and
the processor having a query optimizer implemented thereon, wherein the query optimizer that: receives a data structure comprising an indexed view of the database, the indexed view expressing a result of a predefined query applied to the database, the indexed view to be employed when a query similar to the predefined query is applied to the database;
determines an operator tree as a relational tree that defines the received indexed view, the operator tree including a plurality of relational operators, each relational operator having child scalar expressions; and
for each relational operator in the determined operator tree:
obtains the child scalar expressions of the relational operator;
compares the obtained child scalar expressions to the determined tree representation for the received data modification statement to determine that a corresponding field of the indexed view of the database is affected by the data modification statement, and based thereon modifies a query plan corresponding to the data modification statement so as to update the indexed view of the database to be consistent with the modified data within the database,
wherein the data modification statement comprises an update command and the data structure comprises a user-defined type (UDT) derived by way of inheritance from another UDT, the derived UDT including each field of the another UDT and at least one additional field, the operator tree determined from the data structure referencing the another UDT and including an operator directing that the another UDT be treated as the derived UDT so as to access the at least one additional field, and
wherein comparing the obtained child scalar expressions to the determined tree representation comprises walking the determined tree representation, matching subfields used in the child scalar expressions with subfields updated in the determined tree representation, and generating for each match a query execution plan to propagate the corresponding updated subfield to the index.

8. The system of claim 7, wherein the front end comprises a parser and algebrizer that transforms the textual representation of the data modification statement into tree nodes.

9. The system of claim 7, wherein the query optimizer determines which fields of the data structure are affected by the data modification statement by comparing the tree representation for the fields of the data structure and the tree representation for the data modification statement.

10. The system of claim 9, wherein the query optimizer compares the tree representation for the fields of the data structure and the tree representation for the data modification statement by, for each relational operator in the tree representation for the fields of the data structure, determining scalar expressions and comparing the scalar expressions to the tree representation for the data modification statement.

11. The system of claim 7, wherein the query optimizer determines which fields of the data structure are affected by the data modification statement by walking the tree representation for the data modification statement attempting to match fields of the data structure.

12. The system of claim 11, wherein the query optimizer walks the tree representation for the data modification statement in a top-down manner and matches the fields of the data structure from bottom to top.

13. The system of claim 7, wherein the query optimizer determines which fields of the structure are affected by the data modification statement by matching fields of the data structure with fields in the data modification statement.

* * * * *

UNITED STATES PATENT AND TRADEMARK OFFICE
CERTIFICATE OF CORRECTION

| | | |
|---|---|---|
| PATENT NO. | : 7,769,770 B2 | Page 1 of 1 |
| APPLICATION NO. | : 10/891220 | |
| DATED | : August 3, 2010 | |
| INVENTOR(S) | : Bruno H. M. Denuit et al. | |

It is certified that error appears in the above-identified patent and that said Letters Patent is hereby corrected as shown below:

In column 17, line 30, in Claim 7, delete "optimizer that:" and insert -- optimizer: --, therefor.

Signed and Sealed this
Eighth Day of February, 2011

David J. Kappos
*Director of the United States Patent and Trademark Office*